United States Patent
Joseph et al.

(12)

(10) Patent No.: US 10,776,805 B1
(45) Date of Patent: Sep. 15, 2020

(54) PROVIDING DISCOUNTS TO NON-PARTNER MERCHANTS

(71) Applicant: Groupon, Inc., Chicago, IL (US)

(72) Inventors: Anthony Joseph, Chicago, IL (US); Jonathan Li On Wing, Chicago, IL (US); Zhi Guo, Chicago, IL (US)

(73) Assignee: Groupon, Inc., Chicago, IL (US)

( * ) Notice: Subject to any disclaimer, the term of this patent is extended or adjusted under 35 U.S.C. 154(b) by 141 days.

(21) Appl. No.: 15/858,335

(22) Filed: Dec. 29, 2017

Related U.S. Application Data (60) Provisional application No. 62/440,117, filed on Dec. 29, 2016.

(51) Int. Cl.
*G06Q 30/02* (2012.01)
*G06Q 20/08* (2012.01)
*G06Q 20/32* (2012.01)

(52) U.S. Cl.
CPC ....... *G06Q 30/0224* (2013.01); *G06Q 20/085* (2013.01); *G06Q 20/3224* (2013.01); *G06Q 30/0236* (2013.01)

(58) Field of Classification Search
CPC .................................................. G06Q 30/02
USPC ........................................................ 705/14.25
See application file for complete search history.

(56) References Cited

U.S. PATENT DOCUMENTS

| | | | |
|---|---|---|---|
| 10,354,278 B2* | 7/2019 | Silvestro | G06Q 30/0261 |
| 2003/0069787 A1* | 4/2003 | Tendon | G06Q 30/02 705/14.28 |
| 2012/0278150 A1* | 11/2012 | Chen | G06Q 30/00 705/14.19 |
| 2013/0166386 A1* | 6/2013 | Simmons | G06Q 30/0261 705/14.58 |
| 2018/0174130 A1* | 6/2018 | Shroff | G06Q 30/0267 |

OTHER PUBLICATIONS

Methods and Systems for Detecting Geographic Areas Having Elevated Supply and Demand Levels, U.S. Appl. No. 62/436,270.
Methods and Systems for Detecting Geographic Areas Having Elevated Supply and Demand Levels, U.S. Appl. No. 15/847,482.

* cited by examiner

*Primary Examiner* — Marilyn G Macasiano
(74) *Attorney, Agent, or Firm* — Alston & Bird LLP (57) ABSTRACT

The present disclosure is directed toward a system that allows a promotion and marketing system to provide promotions to users of the promotion and marketing system for established that are currently not affiliated with the promotion and marketing system.

20 Claims, 7 Drawing Sheets

PROVIDING DISCOUNTS TO NON-PARTNER MERCHANTS

CROSS-REFERENCE TO RELATED APPLICATION

The present application is related to U.S. Application 62/440,117 entitled "Providing Discounts To Non-Partner Merchants" filed Dec. 29, 2016, the content of which is incorporated herein by reference in its entirety.

BACKGROUND OF THE INVENTION

The present invention relates to a promotion service that may offer promotions related to goods or services provided by a corresponding establishment and consumers may redeem promotions with the corresponding establishment. Applicant has identified a number of deficiencies and problems associated with conventional promotion generation and redemption processes. Through applied effort, ingenuity, and innovation, many of these identified problems have been solved by developing solution that are included in embodiments of the present invention, many examples of which are described in detail herein.

BRIEF SUMMARY OF THE INVENTION

In general, embodiments of the present invention provided herein include method, apparatus, and computer program products for providing discounts to non-partner merchants.

In one embodiment a system comprises of a mobile device and a remote system. The mobile device comprises of communication circuitry configured to facilitate communications with the remote system. The mobile device further comprising processing circuitry wherein the processing circuitry is configured to: access a global positioning system of the mobile device to determine location data of the mobile device, wherein the location data comprises at least a latitude and a longitude. The processing circuitry of the mobile device further configured to determine user account data associated with a user of the mobile device and transmit the location data and the user account data to the remote system. The processing circuitry of the mobile device is further configured to receive, from the remote system, a data object indicative of a promotion value, configured to be rendered on the mobile device in order to display an indication of an establishment and a corresponding promotion value. The mobile device is further configured to transmit, to the remote system, a selection data object indicative of the user interaction with the displayed establishment and promotion value. The remote system comprises of communication circuitry configured to facilitate communications with the mobile device. The remote system further comprises of processing circuitry, wherein the processing circuitry is further configured to receive, from the mobile device, the user account data and location data and determine one or more establishments based at least on the location data. The processing circuitry of the remote system is further configured to determine a consumer value based at least on the user account data, determine a promotion value associated with an establishment, transmit, to the mobile device, the data objective indicative of the promotion and the corresponding establishment and receive, from the mobile device, the selection data object. In one embodiment, if the selection data indicates a user's acceptance of the displayed establishment and promotion value then the processing circuitry of the remote system may associate the promotion value that corresponds to the establishment with user account data, and associate a merchant identifier corresponding to the establishment with the user account data, and provide discount and provide indication the discount has been applied.

In one embodiment, the processing circuitry of the remote system is further configured to receive a payment object indicating a completion of a transaction with the establishment and determine if the received user payment data corresponds to payment data previously associated with the user account data.

In one embodiment, the payment object comprises a merchant identifier corresponding to the establishment and the processing circuitry of the remote system is further configured to determine if the received merchant identifier corresponds to the merchant identifier previously associated with the user account. In another embodiment, the processing circuitry of the remote system is further configured to transmit to a financial institution a payment credit for a dollar amount equal to the promotion value if the received user payment data positively corresponds to the payment information and the received merchant identifier positively corresponds to the stored merchant identifier.

In one embodiment, the user payment data indicates that the promotion value has not been applied.

In one embodiment, the processing circuitry of the remote system is configured to determine the promotion value by accessing a menu corresponding to the establishment, identifying a first average price of a first portion of the menu, identifying a second average price of a second portion of the menu, identifying a third average price of a third portion of the menu, determine a total meal coast by adding the first second and third average prices together. Then the processing circuitry of the remote system is configured to determine a savings percentage based on consumer value and calculate the promotion values as a function of the total meal savings percentage. In one embodiment, the first portion of the menu corresponds to appetizers, the second portion of the menu corresponds to entrees and the third portion of the menu corresponds to beverages.

BRIEF DESCRIPTION OF THE DRAWINGS

Reference will now be made to the accompanying drawings, which are not necessarily drawn to scale, and wherein.

DETAILED DESCRIPTION

Some embodiments of the present invention will now be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Terms

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services in relation to one or more providers in the form of redeemable coupons, vouchers, promotions and the like for goods, services, experiences and/or the like that are provided by said providers. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "establishment" may include, but is not limited to, a merchant, business owner, consigner, shopkeeper, tradesperson, vender, operator, entrepreneur, agent, dealer, restaurant, organization or the like that is in the business of a providing a good, service or experience to a consumer, facilitating the provision of a good, service or experience to a consumer and/or otherwise operating in the stream of commerce. For example, a provider may be in the form of a restaurant.

The term "financial service" may include a service that provides financial transaction services for a consumer. For example, a financial service may be a bank or a credit card company that is capable of facilitating purchase of a consumer.

As used herein, the term "consumer" or "user" may include, but is not limited to, a client, customer, purchaser, shopper, user, or the like, who may be in the position to or does exchange value for one or more vouchers under the terms defined by one or promotions. For example, and using the aforementioned running company as the example provider, a consumer may be an individual who is interested in purchasing running shoes.

The term "user account" or "user profile" may include any information related to a user such as, but is not limited to, as name, email address, physical address, payment information, transaction history, and dining history. User account data may also include data captured from an application (i.e. captured information) such as GPS data, application usage data, interaction data that indicates a user's interaction with an application, and the like. User account data may also include derived information such as information that may be derived from a combo of user provided data (e.g. name, addresses, email address) and captured information to determine information with a reasonable degree of confidence. For example, using user provided data of a physical address and captured information of GPS data, it is possible to derive a user's daily commute.

Mobile Device and Promotion and Marketing Service System

Figure 1:
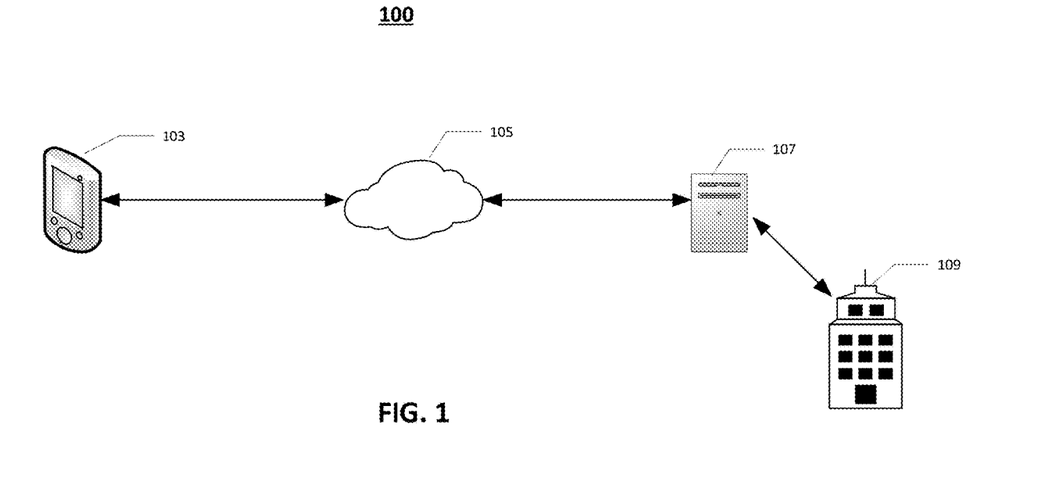
FIG. 1 illustrates an example of a system in accordance with some embodiments discussed herein.

FIG. 1 is an illustrative embodiment of system 100 including an example network architecture for a system, which may include one or more devices and sub-systems that are configured to implement some embodiments discussed herein. System 100 comprises mobile device 103, network 105, promotion and marketing service system 107, and financial service system 109. The mobile device 103 may be any mobile device that is capable of communicating, displaying and processing data over a suitable network. For example mobile device 103 may be a cellular phone, a mobile phone, a personal digital assistant, laptop, desktop, tablet and the like. The network 105 may be any network capable of facilitating communications between mobile device 103, promotion and marketing service system 107, and possible financial service system 109. For example, network 105 may include any wired or wireless communication network including a wired or wireless local area network (LAN), personal area network (PAN), metropolitan area network (MAN), wide area network (WAN), or the like, as well as any hardware, software and/or firmware required to implement it (e.g. network routers and network switches). For example, network 105 may include a cellular telephone, an 802.11, 802.16, 802.20 and/or WiMax network. Further, network 105 may include a public network, such as the Internet, a private network, such as an intranet, or combinations thereof, and may utilize a variety of networking protocols now available or later developed including, but not limited to TCP/IP based networking protocols.

Promotion and marketing service system 107 may be a service suitable to provide promotions related to one or more establishments to a user of mobile device 103 via network 105. Promotion and marketing service system 107 may also communicate with financial service system 109 using network 105 of a separate network to provide payment on behalf the user of mobile device 103. Promotion and marketing service system may be comprised of a plurality of database and servers to implement the functionalities described herein. Financial service system 109 may be any service system that is capable of completing a financial transaction related to the user of mobile device 103. In some embodiments, financial service system 109 may be a credit card company and/or a bank that processes purchases made by the user of mobile device 103. In some embodiments, promotion and marketing service system 107 and financial service system 109 may exist as a single entity. Financial service system 109 may be comprised of a plurality of database and servers to implement the functionalities described herein.

Overview

In general, the present invention allows a user of a mobile device to receive one or more promotional offers provided by a promotion and marketing service system for one or more non-affiliated restaurants. From the user's prospective he is able to receive promotional offers based in part on his current location in relation to one or more restaurants. A user may be willing to try one or more restaurants if he is offered a discount corresponding to that restaurant. Often when a promotion is provided for a restaurant, the restaurant is a member of a promotion and marketing service system's network (i.e. affiliated). For example, if Company X were to offer a promotional value for $25 off a meal at Outback Steakhouse™, then Outback Steakhouse™ would typically be a member of Company X's network (i.e. affiliated). However, the present invention allows a promotion and marketing service system to offer a discount for a non-affiliated restaurant. For example, Bob's Restaurant is not currently a member of Groupon's® promotion system (i.e. non-affiliated). Using the features described in this disclosure, Groupon® is able to offer a user of a mobile device a promotion for dining at Bob's Restaurant without Bob's Restaurant being a member of Groupon's® promotion network. For example, a promotion and marketing service determines an amount to offer to a user of a mobile device to dine at Bob's Restaurant. The user then dines at Bob's Restaurant and is charged the full amount of the meal. Without any actions by Bob's Restaurant or the user of the mobile device, the promotion and marketing service automatically credits the user of the mobile device's account with a value corresponding to the promotion value.

The described system is also advantageous to the non-affiliated restaurant. In reference to the above example, Bob's Restaurant may see an increase in customers, based in part because of the promotional offers offered by the promotion and marketing service system. The promotion and marketing service may provide discounts related to Bob's Restaurant and other non-affiliated restaurants for a certain period of time in order to incentivize the non-affiliated restaurants to become affiliated with the promotion and marketing service. In addition, for the promotion and marketing service system the present invention allows them to see how successful certain promotions are before deciding if they want to implement said promotions on a permanent basis. As can be seen the present disclosure offer benefits to consumers, non-affiliate restaurants, and promotion and marketing service systems.

Operation of the Mobile Device

Figure 2:
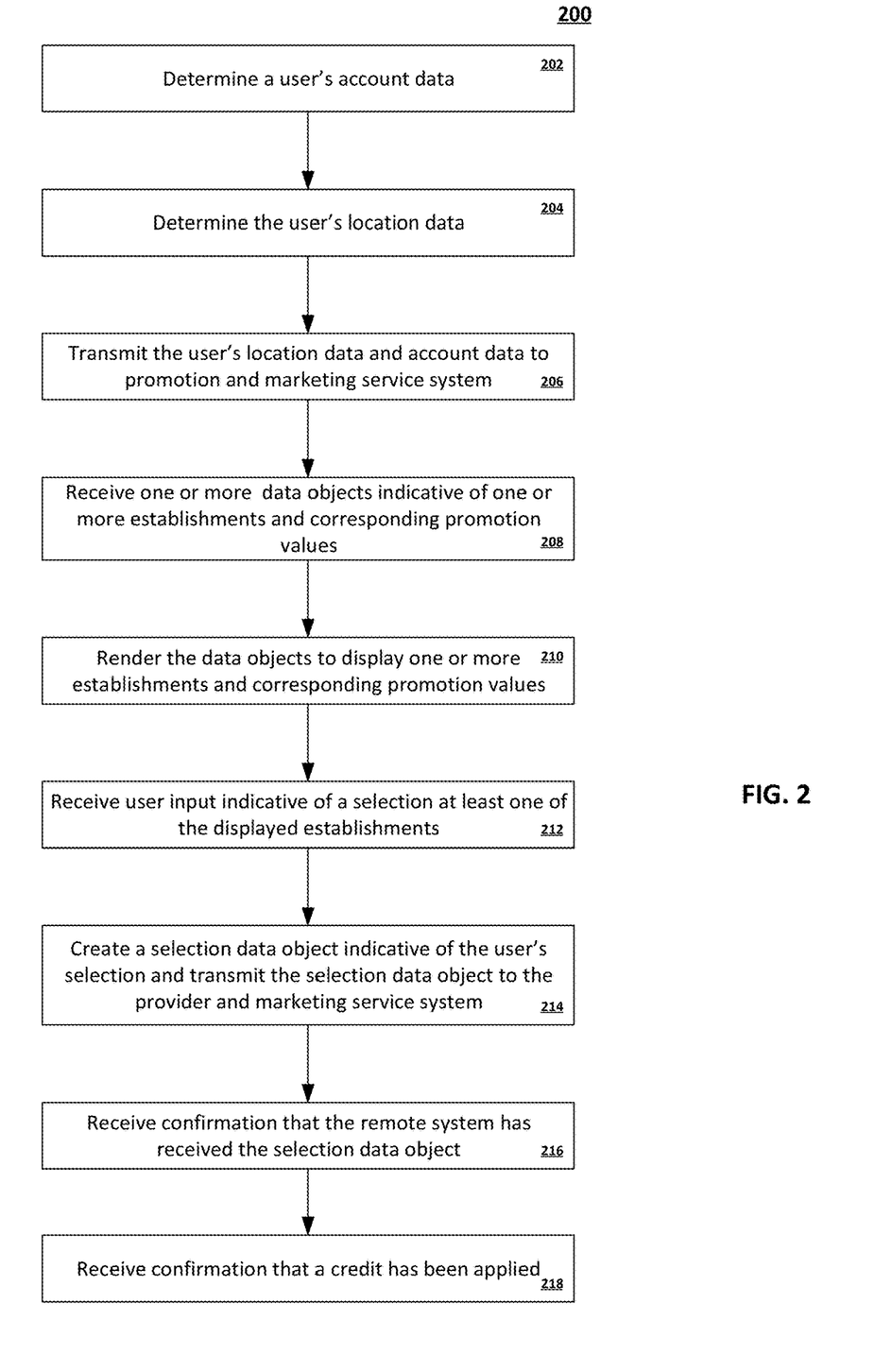
FIG. 2 illustrates a flow diagram of an example system in accordance with some embodiments discussed herein.

FIG. 2 discloses an exemplary method of operation from the prospective of the mobile device. At step 202, the processing circuitry of the mobile device determines a user's account data. This may be done by having the user log-in to the mobile device or an application running on the mobile device, by providing some type of credentials (e.g. PIN, biometric, password). In another embodiment, the communication circuitry of the mobile device may send user identification information to the promotion and marketing service system to obtain user's account data. User's account data may include any information related to a user including, but not limited to, name, address, coupon information, payment information, transaction history, dining history, current and past location, age, gender, mobile device identifier, email, phone number, coupon information history, internal user identification and the like.

In one embodiment, at step 202, the processing circuitry of the mobile device may determine a user's account data based on captured information. Such an embodiment may be implemented when there is no pre-existing user account data. For example, instead of a user logging-into the mobile device or an application running on the mobile device, the application running on the mobile device may capture, for instance, GPS data, of the mobile device and upload this GPS data to a user's account. Thus, even without a pre-existing user account, an application on a mobile device may still determine and create user account data.

At step 204, the user's location data is determined by processing circuitry of the mobile device. The location data may indicate the current and past locations of the mobile device. The processing circuitry of the mobile device may determine the user's location data by accessing an internal or external global positioning system. In other embodiments, location data may be determined by other known means such as cellular triangulation, Local Area Network signal strength, and the like. In one embodiment, the user's location may be determined by the user's home address. In some embodiments, the location data indicates longitude and latitude coordinates.

At step 206, once the user's account data and location data have been determined data steps 202 and 204 at least a part of the user's account data and the location data is transmitted, via the communication circuitry of the mobile device, to the promotion and marketing service system. Transmission may be done over any conventional means such as through a cellular network, the Internet, Local Area Network and the like.

At step 208, in response to transmitting at least a part of the user's account data and the location data, the communication circuitry of the mobile device receives, from the promotion and marketing service system, one or more data objects indicative of one or more establishments and corresponding promotion values. At step 210, the data objects are rendered by the processing circuitry of the mobile device to display to, via a mobile device interface, the one or more establishments and corresponding promotion values. The displayed establishments and corresponding promotion values may be editable such that they may be arranged in a customizable order, such as by closest establishment, highest percent off, most popular establishment, average user review of the establishments, and the like. In one embodiment, the order of the displayed establishments and corresponding promotion values may be based on the determined likelihood that a user will purchase the promotion value. The likelihood may be determined by looking at derived information in a user's account. For example, if the user's preference show that a user frequently dines at Italian restaurants then Italian restaurants may be displayed prior to Japanese, Korean, and American restaurants. In one embodiment, each one of the displayed establishments and corresponding promotion values may be actuators such that when engaged by a user of the mobile device cause the mobile device perform a subsequent action.

At step 212, the processing circuitry of the mobile device receives an input from the user that indicates that the user has selected at least one of the displayed establishments. The user may select the establishment by various means such as by physically touching a location on the mobile device's display which is interpreted by the processing circuitry as a selection of that particular establishment. In other embodiment, the processing circuitry of the mobile device may receive user audio indicative of a selection of the one of the displayed establishments. Once, it has been determined by the processing circuitry of the mobile device that the user has selected an establishment a terms and conditions page may be presented to the user. The terms and condition page may indicate the terms and conditions associated with accepting and later redeeming the promotion value.

At step 214, the processing circuitry of the mobile device creates a selection data object that indicates the user's selected establishment and then the communication circuitry of the mobile device transmits the selection data object to the promotion and marketing service system. At step 216, via the communication circuitry of the mobile device confirmation is received that the promotion and marketing service system has received the selection data object. At this point the user is able to use, redeem, or apply the promotion value by completing a qualifying transaction with the selected establishment. A qualifying transaction is one that is within the terms and conditions of the promotion value as described in relation to step 212. The received confirmation may also include additional establishment information. For example, additional establishment information may include map data that is configured to be used by the processing circuitry of the mobile device to render and guide, with the help of a global position system, the user to the establishment. In another example, additional establishment information may include reservation data, which includes indication of available times to either pick-up and dine in at the establishment, such that a processing circuitry of the mobile device is able to return a reservation selection in response to the reservation data which indicates a desired reservation time and date.

After a user has completed a qualifying transaction then at step 218, the communication circuitry of the mobile device receives a confirmation that a credit has been applied to an account associated with the user. In some embodiments, the account associated with the user in this step may be a user's account with the promotion and marketing service system. For example, a $10 credit may be applied to a user's account that is usable for a future promotion purchase. In another embodiment, the account associated with the user may be a user's bank account or credit card account. For example, a $10 credit may be credited to a user's bank account or credit card statement.

Operation of the Promotion and Marketing Service System

Figure 3:
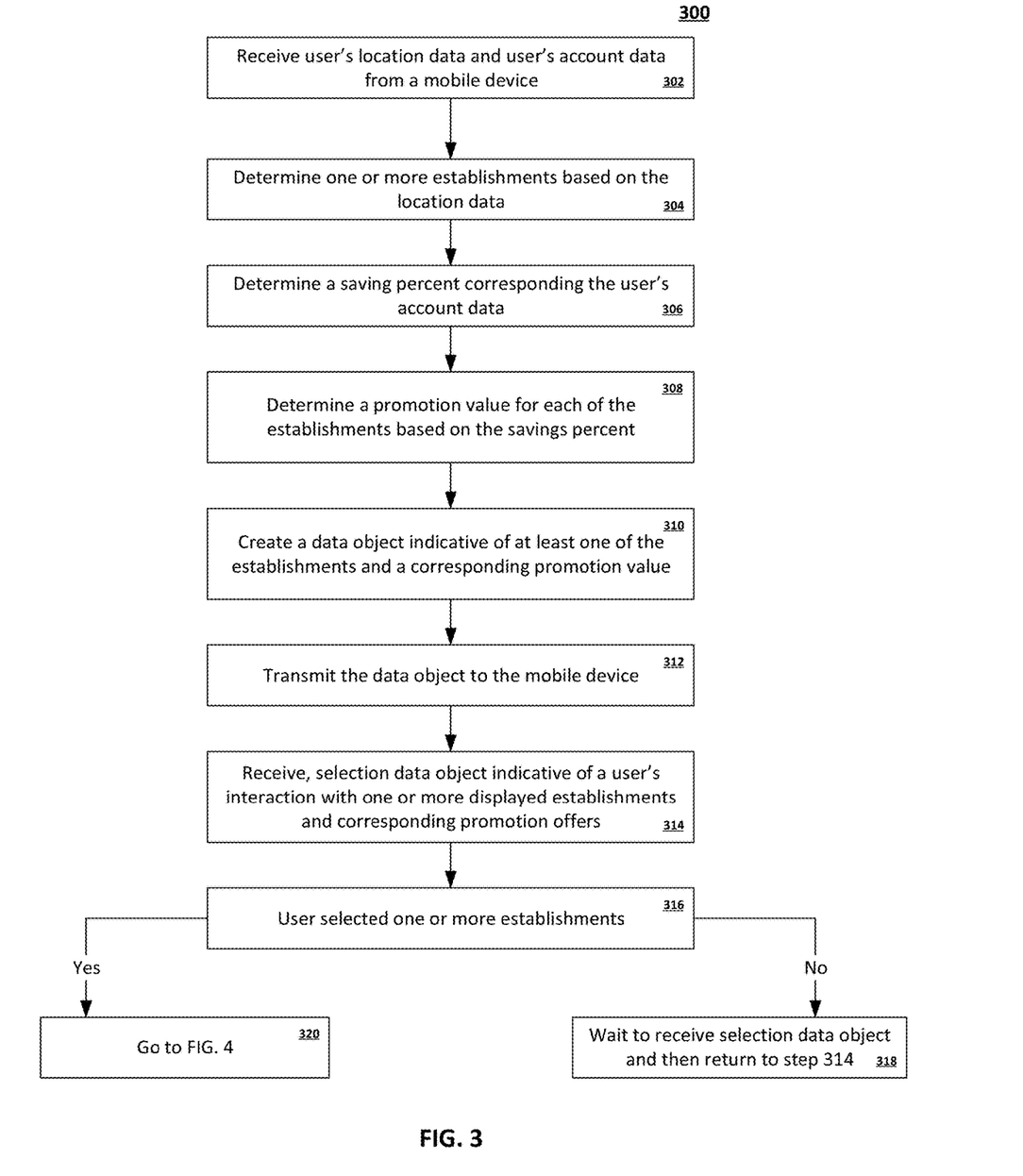
FIG. 3 illustrates a flow diagram of an example system in accordance with some embodiments discussed herein.

FIG. 3 illustrates exemplary process 300 performed by a promotion and marketing service system. At step 302, communication circuitry of the promotion and marketing service system receives transmitted location data and user's account data from a mobile device. At step 304, the processing circuitry of the promotion and market service system determines one or more establishments based on the location data. The processing circuitry may reference a collection of establishments stored in a memory of the promotion and market service system in order to determine establishments in close proximity to the mobile device. The processing circuitry may also reference the user's account data to find not only an establishment in close proximity but an establishment that corresponds to the user's account data. For example, if the user's account data indicates that a user owns an Audi automobile, then only establishments serving Audi automobiles in close proximity will be initially shown. Other techniques for determining one or more establishments based on location data are discussed further in U.S. Patent Application No. 62/436,270 entitled "Methods and Systems For Detecting Geographic Areas Having Elevated Supply and Demand Levels," incorporated by reference in its entirety above.

At step 306, the processing circuitry determines a savings percent corresponding to the user's account data. This process is further described with reference to FIG. 7.

Figure 5:
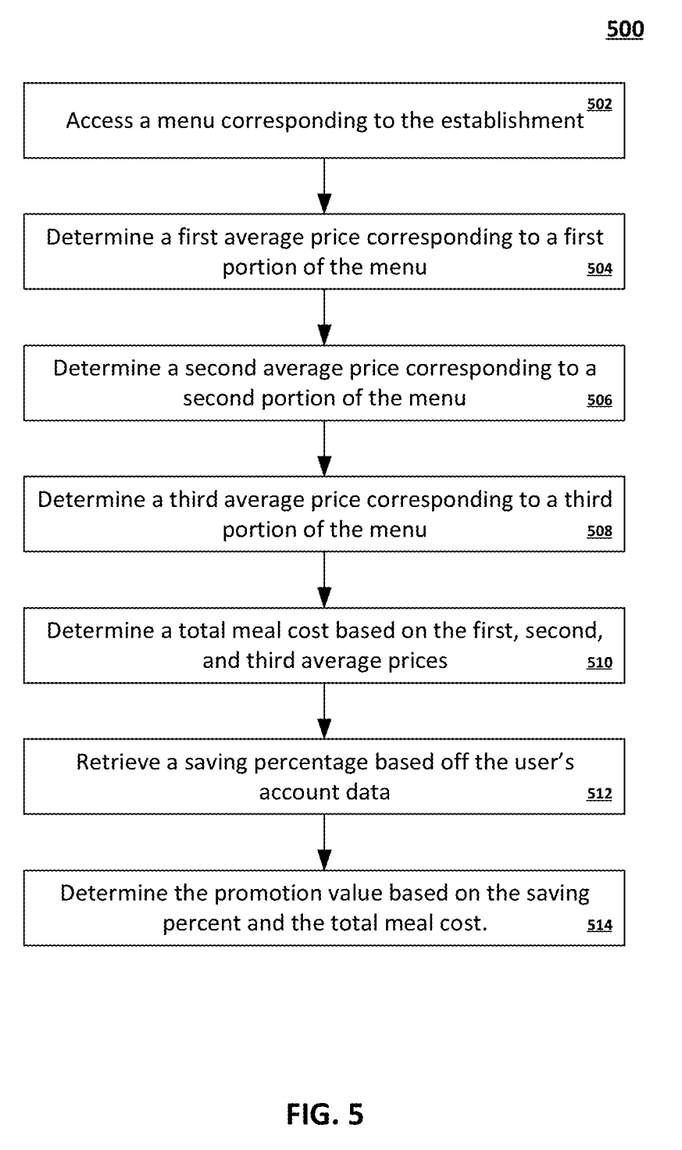
FIG. 5 illustrates a flow diagram of an example system in accordance with some embodiments discussed herein.

At step 308, a promotion value for each establishment is determined based on the savings percent. The process of determining the promotion value is detailed by process 500 as illustrated in FIG. 5 and described below.

At step 310, the processing circuitry of the promotion and marketing service system creates a data object that indicates one or more determined establishments (from step 304) and each establishment's corresponding promotion value (from step 308). This created data object is formatted such that is configured to be rendered by the receiving mobile device so that the user of the mobile device may review and potentially select an establishment and a corresponding promotion value. At step 312, using the communication circuitry of the promotion and marketing service system, the data object is transmitted to the mobile device.

At step 314, the communication circuitry of the promotion and marketing service system receives the selection data object from the mobile device that is indicative of the user of the mobile device's interaction with one or more displayed establishments and corresponding promotion offers that were indicated in the transmitted data object (from step 310).

At step 316, the processing circuitry of the promotion and marketing service system determines if the selection data object indicates the user's selection of one or more establishments. In some embodiments, the selection data object or corresponding communications from the user must indicate an acceptance of terms and agreements associated with using the selected promotion. If the selection data object indicates the user has selected one or more establishment the process moves on to step 320. However, if the selection data object indicate the user has not selected or more establishments and/or has not accepted the terms and agreements corresponding to the promotion offer for the selected establishment then the process moves to step 318. As described above, the acceptance of the terms and agreement associated with a promotion value may be optional. At step 318, the processing circuitry of the promotion and marketing service system waits to receive another data selection object and then the process returns to step 314.

Figure 4:
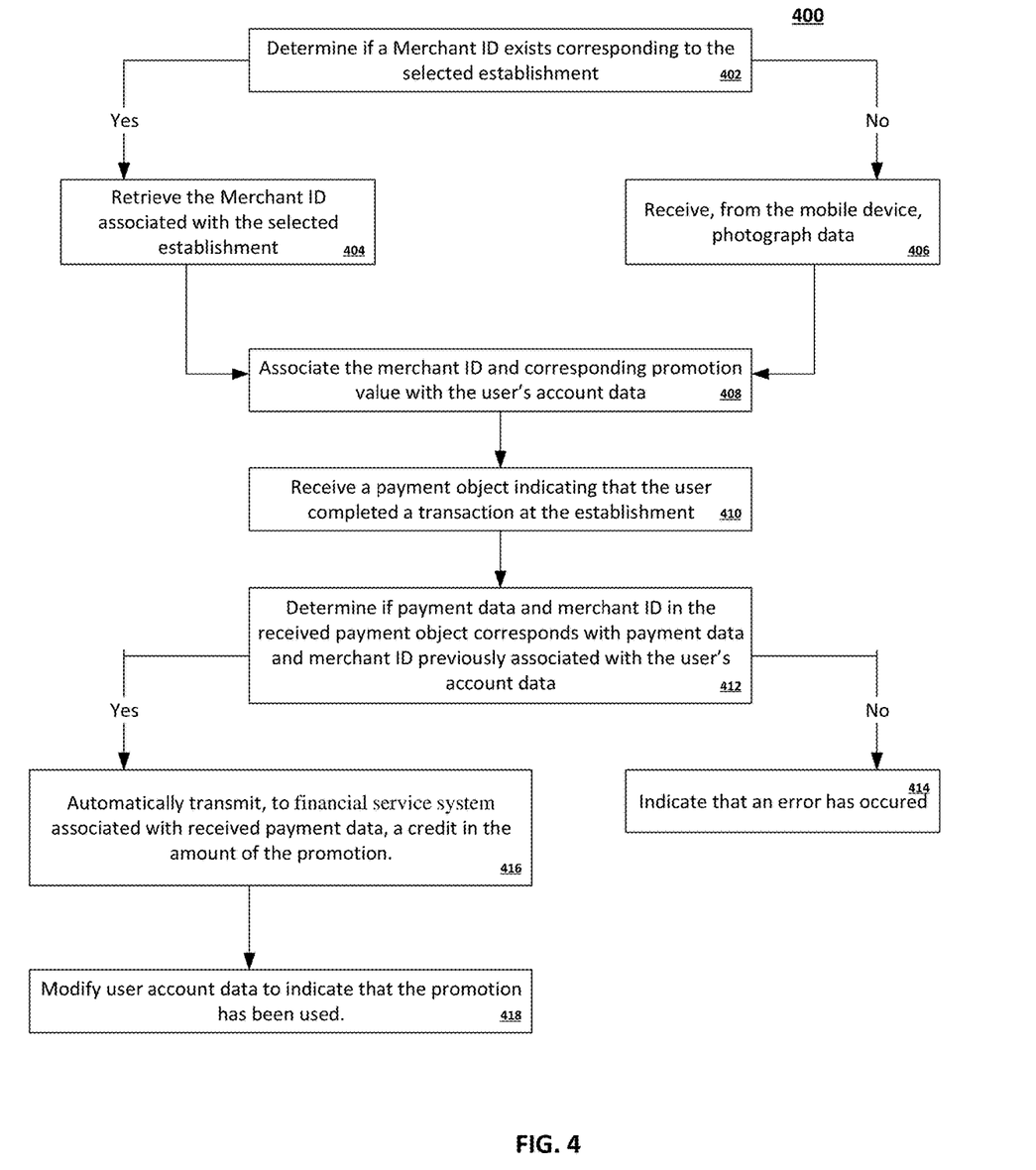
FIG. 4 illustrates a flow diagram of an example system in accordance with some embodiments discussed herein.

FIG. 4 describes exemplary process 400, which is initiated after it is successfully determined by the processing circuitry of the promotion and marketing service system that the user has selected an establishment. At step 402, the processing circuitry of the promotion and marketing service system determines if a merchant ID exists corresponding to the selected establishment. The merchant ID's may be stored in memory associated with the promotion and marketing service system. In another embodiment, the communication circuitry of the promotion and marketing service system may query the establishment itself to request a merchant ID. The merchant ID may be stored by a third party service, and the communication circuitry of the promotion and marketing service may query the third party service to determine if there is a pre-existing merchant ID for a particular establishment. If it is determined that a merchant ID already exists then at step 404 the merchant ID associated with the selected establishment is retrieved. However, if there is not a preexisting merchant ID then at step 406, the communication circuitry of the promotion and marketing service system, receives from the mobile device photograph data of a receipt corresponding to a user's transaction with the selected establishment. The processing circuitry of the promotion and marketing service system is then able to determine a merchant ID from the received photograph data. In one embodiment, the photograph data will validate that a user has in fact gone to the establishment, and that the transaction is a qualifying transaction. Furthermore, the photograph data may be utilized to help determine the appropriate amount the discount of the promotion value redeemed by the user. For example, a user may have a 10% off of $100 or more. A user may then take a photograph of the receipt and send it to the promotion and marketing service system. The photograph data (i.e. information contained in the receipt) will indicate the total cost of the meal and from that the 10% discount can be determined and subsequently refunded to the user.

At step 408, the processing circuitry of the promotion and marketing service system associates the merchant ID and a corresponding promotion value with the user's account data. By associating the merchant ID with the user's account data, the processing circuitry is able to identify which promotion values each user has.

At step 410, the communication circuitry of the promotion and marketing service system, receives a payment object indicating that the user has completed a transaction at the establishment. The payment object may generated by the user's mobile device, by the establishment, or by a financial service system that processed the completed transaction. The payment object includes at least a merchant ID, user identity, and user payment data.

At step 412, the processing circuitry of the promotion and marketing service system determines if the payment data and merchant ID in the received payment object corresponds with the payment data and merchant ID previously associated with the user's account data. This determination is used to authenticate the payment transaction that the payment object identifies. In some embodiments, the user's account data may have more than one payment data associated and the received payment data must correspond to one or more of the previously stored payment data. In one embodiment, payment data includes a credit card number, debit card number, PayPal® account information, Venmo® account information and the like. If it is determined that the received payment data and/or merchant ID does not correspond to the previously stored merchant ID and payment data then process 400 goes to step 414. However, if it is determined that the received payment data and merchant ID do correspond to the previously stored merchant ID and payment data then process 400 goes to step 416.

At step 414, the processing circuitry of the promotion and marketing service system returns an error that indicates that there was a problem authenticating the received payment data. The processing circuitry may then, using the communication circuitry, transmit further authentication requests to the establishment, the financial service system which processed the transaction associated with the payment data, and/or to the user associated with the received payment data.

At step 416, the processing circuitry of the promotion and marketing service system transmits, using the communication circuitry, a credit to the financial service system that corresponds to the received payment data for an amount equal to the promotion value. This process is done without any additional action by the user of the mobile device and the selected establishment. For example, a user has received a promotion for $10 dollars to dine at Bob's Bistro. The user dines at Bob's Bistro and his meal total is $50. The user would then pay the full $50 amount to Bob's Bistro, using a payment method that has previously been associated with his account data. However, in some embodiments, a payment method may be utilized that has not previously been associated with the users account data as long as additional authentication information is provided to the promotion and marketing server system. A financial service system such as a bank and/or a credit card company will process the user's transaction. Then, once payment data is sent to the promotion and marketing service system the processing circuitry of the payment data transfers from an account associated with the promotion and marketing service an amount equal to the promotion value to the financial service system to be credited to the user's transaction amount related to Bob's Bistro. As a result, Bob's Bistro receives the full amount of the transaction and the user receives a discount.

At step 418, the processing circuitry of the promotion and marketing service system modifies the user account data to indicate the promotion has been used. Step 418 prevents the user from unauthorized multiple uses of promotion data as well as allows the promotion and marketing service system to keep an accurate record of which promotions are being utilized.

Process for a Promotion Value

Now, with reference to FIG. 5, at step 502, processing circuitry of the promotion and marketing service system accesses a menu corresponding to the establishment. The menu may be stored in memory of the promotion and marketing service system. In other embodiments, communication circuitry of the promotion and marketing service may be utilized to contact the establishment itself to acquire the menu. In other embodiments, the communication circuitry of the promotion and marketing service may contact a third party vendor to provide the menu.

At step 504, the processing circuitry of the promotion and marketing service system analyzes the retrieved menu. In one embodiment, the processing circuitry of the promotion and marketing service system parses the menu into at least three different portions. Once the menu is parsed the processing circuitry determines a first average price corresponding to a first menu portion. For example, the first menu portion may correspond to an appetizer portion of the menu. The appetizer portion may be identified by meta-data associated with the menu or a heading associated with the first portion of the menu. The processing circuitry of the promotion and marketing service system identifies a price associated with one or more items in the first portion of the menu and then calculates an average price of the first menu portion. In one embodiment, the average price may be calculated by only considering a portion of the items in the first portion of the menu. For example, if there are 10 menu items in the appetizer section of the menu, the average may be calculated, using the processing circuitry of the promotion and marketing service system, using only 5 of the menu items. Those menu items may be determined by various means including, but not limited to, the top 5 recommended menu items, the top 5 customer reviewed items, an establishment (i.e. the restaurant for which the menu selected 5 menu items. In other embodiments, the processing circuitry of the promotion and marketing service system may use all of the menu items in the first portion of the menu to calculate the average.

At step 506, the processing circuitry performs a similar process as described in step 504. However, instead of the processing circuitry performing this process on a first menu portion it is performed on a second menu portion. For example, the second menu portion may correspond to an entrée portion of the menu.

At step 508, the processing circuitry performs a similar process as described in steps 504 and 506. However, instead of the processing circuitry performing this process on a first or second menu portion it is performed on a third menu portion. For example, the third menu portion may correspond to a beverage portion of the menu. In other embodiments, the third menu portion may correspond to a desert portion of the menu.

At step 510, the processing circuitry of the promotion and marketing service system determines a total meal cost based on the first, second, and third average prices calculated in steps 504-508 above. In one embodiment, the total meal cost is determined by adding up the first second and third average prices. In other embodiments, the total meal cost may take the average of the first, second, and third average prices. Although process 500 describes parsing a menu into three portions it is within the scope of this invention to separate a menu into any number of portions and determine a total menu portion based off those one or more portions using a method described herein. For example, a menu may be parsed into an appetizer portion, entrée portion, dessert portion, beverages portion, and side portion. Furthermore, the selected menu portions may be determined based on a user's preferences. For example, if a user does not eat meat then only menu items that do not contain meat are used to calculate the total meal cost. In another example, if a user does not drink alcohol then only menu items that do not contain alcohol are used to calculate the total meal cost. In another embodiment, the received user account data and/or the selection data object may indicate a user has a strong preference for a certain type of food and only that certain type of food is considered when calculating the total meal cost. For example, if a user mostly eats hamburgers (as identified by his account data) then the total meal cost for Bob's Burger Joint may be calculated based on items relating to hamburgers (e.g. burgers, hot dogs, french fries, milkshakes and the like) and other items such as chicken tenders, salads, and the like may be excluded. As such the total meal cost is customizable based on user preferences identified from user's account data and/or received selection data object.

At step 512, a savings percentage is retrieved based on the user's account data. The determination of the saving is determined by process 700 as described in FIG. 7.

At step 514, the promotion value in step 510 and the retrieved saving percentage are used to determine the total promotion value. For example, if the savings percentage is 10% and the total meal cost is $50 for establishment A, then the communication circuitry of the marketing and promotion system can offer a user a $5 coupon to try non-affiliated establishment A.

Process for Calculating Saving Percent

Figure 7:
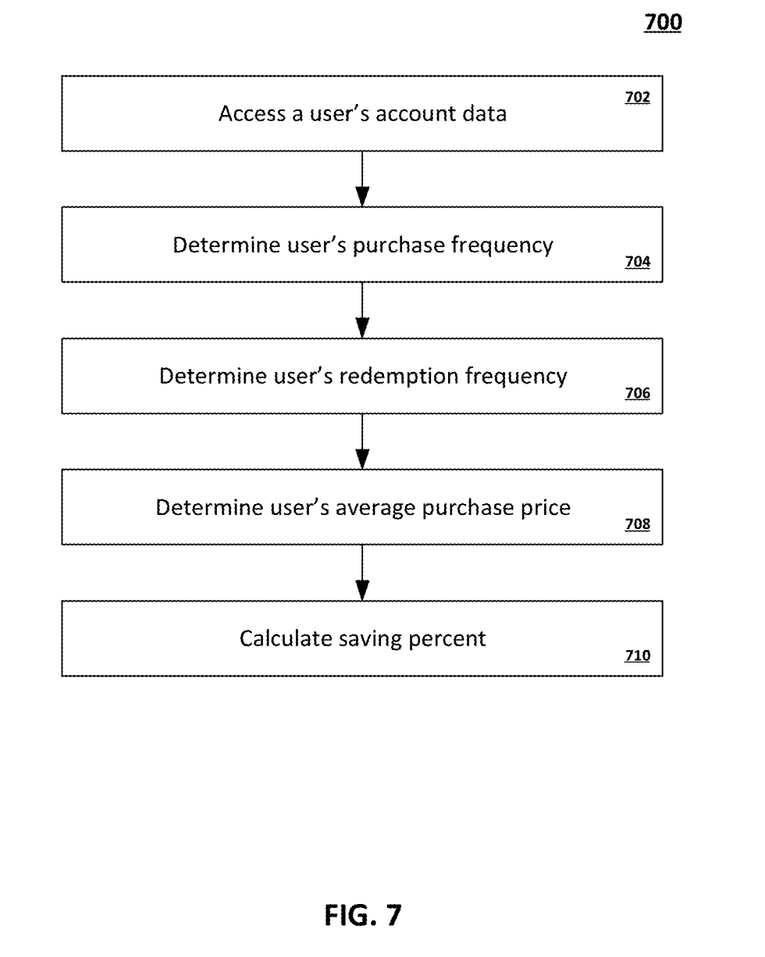
FIG. 7 illustrates a flow diagram of an example system in accordance with some embodiment discussed herein.

FIG. 7 describes exemplary method 700 for calculating a savings percent for a particular user. Generally, the savings percent is determined in order to calculate a promotion value (see step 514 in FIG. 5). At step 702, processing circuitry of the promotion and marketing service system accesses a user's account data. The user's account data may take various forms, such as shown in Table 1 below.

TABLE 1

| Establishment | Coupon | Purchase Date | Redemption Date |
|---|---|---|---|
| Bill's BBQ | $25 for $50 | Dec. 20, 2014 | Dec. 20, 2014 |
| Jack's Steaks | $45 for dinner for 2 ($75 value) | Dec. 25, 2014 | |
| Sub Shop | $25 for $50 | Jan. 5, 2015 | Mar. 10, 2015 |
| Chuck's Body Shop | $50 for Extreme Detail Service ($150 value) | Mar. 5, 2015 | Apr. 6, 2015 |
| Ted's Donuts | $25 for $50 | May 5, 2015 | May 6, 2015 |

User's account data may contain a list of establishments and corresponding coupon information. In addition, user's account data may contain other information such as the user's location, user's preferences (food and location), rejected coupon offers, accepted coupon offers, and the like. At step 704, from the user's account data the processing circuitry of the promotion and marketing service system determines the user's purchase frequency. The purchase frequency is the frequency at which a user purchases coupons from the promotion and marketing service system. The timeline metric for determining purchases may vary. For example, the time metric may be week, month, 3 months, 6 months, 9 months, a year, and the like. In one embodiment, the processing circuitry of the promotion and marketing service system may determine how many coupons a user purchased within the last 3 months (from the current date). Alternatively the processing circuitry of the promotion and marketing service system may calculate the amount of time since a user last purchased a coupon. For example, with reference to Table 1, the processing circuitry of the promotion and marketing service system may determine that since Jan. 1, 2015, the user has only purchased 2 coupons. The purchase frequency is helpful to determine how active a user is. The more coupons a user purchases the more active the user is. Regardless of the methodology used to calculate the purchase frequency, after the purchase frequency is determined process 700 moves to step 706.

At step 706, the processing circuitry of the promotion and marketing service system determines the user's redemption frequency. The redemption frequency is the frequency at which a user redeems previously purchased coupons from the promotion and marketing service system. This redemption frequency may be calculated based on time and/or percentage. When using percentage, the processing circuitry of the promotion and marketing service system will calculate the percentage of redeemed coupons as a factor of purchased coupons. This metric may be used to determine percentage over a period time. For example, with reference to Table 1, the processing circuitry of the promotion and marketing service system may determine that the user has a redemption frequency of 80%. Alternatively, the processing circuitry of the promotion and marketing service system may qualify the redemption frequency percentage based on time. For example, with reference to Table 1, the processing circuitry of the promotion and marketing service system may determine that since 2015 the user has a 100% redemption frequency. In another embodiment, percentages may not be used to calculate the redemption frequency. With reference to the last example, the processing circuitry of the promotion and marketing service system may determine since 2015 the user's redemption frequency is 3. The redemption frequency helps indicate the value of a user. If a user purchases coupons but does not use them then this could lead to a potential loss of income for the promotion and marketing service system and/or the corresponding establishment. In an ideal scenario a user would have a 100% redemption percentage. In some embodiments, after the redemption frequency is determined, the redemption time lapse is determined.

The redemption time lapse is the amount of time from the purchase of a coupon to the redemption of the coupon. For example, with reference to Table 1, the redemption time lapse for Bill's BBQ would be 0 days. However, the redemption time lapse for Chuck's Body shop is 1 month and 1 day. The redemption time lapse helps indicate the activity of the user. The shorter the time lapse the more active a user is. In some embodiments, the redemption time lapse is an optional calculation.

At step 708, the processing circuitry of the promotion and marketing service system determines the user's average purchase price. The average purchase price may be calculated either based on the amount the user paid for the coupon, the value of the coupon, or the difference between the price paid and the value of the coupon (i.e. savings). For example, with reference to Table 1, the user's average purchase price using the amount the user paid for the coupon would be $34. ((25+45+25+50+25)/5). With continued reference to Table 1, the user's average purchase price using the value of the coupon would be $75 ((50+75+50+150+50)/5). With continued reference to Table 1, the user's purchase price using the difference between the price paid and the value of the coupon would be $41 ((25+30+25+100+25)/5). Each of these methods for calculation offer different information about the user. For example, the amount a user pays for a coupon may indicate an amount the user is willing to pay for a particular coupon regardless of the actual savings the coupon is worth. In another example, the amount of the coupon value may indicate an intended price range of a user and may also indicate the price range of the goods a user normally purchases without a coupon. In another example, the average user price when using the savings type calculation may indicate that the user is a value shopper who tends to shop for good values. Any or all of these calculations may be used to determine the user's average purchase price.

At step 710, the processing circuitry of the promotion and marketing service system determines the saving percent based on the data generated in steps 702-708. In one embodiment there are tiers of savings and the saving percent is selected from one of the tiers. For example, there may be a 3 tier system. The first tier is reserved for users deemed as Excellent. The second tier is reserved for users deemed as Good. The third tier is reserved for users deemed as Average. Users in the Excellent tier may receive a 10% savings. Users in the Good tier may receive a 6% savings. Users in the Average tier may receive a 5% savings. Which tier as user falls into will depend upon the user's purchase frequency, user's redemption frequency, and/or the user's average purchase price. The specific algorithms and weighting of factors will be market dependent. For example, a user in the Excellent tier may be required to have a user's purchase frequency of 5 coupons per month, a redemption frequency of above 80%, and a user average purchase price of at least $35 (using the savings calculation). In another example, a user in the Good tier may be required to have a user's purchase frequency of 2 coupons per month, a redemption frequency of above 60%, and a user average purchase price of at least $25 (using the savings calculation. In another example, a user in the Average tier may be required to have a user's purchase frequency of 1 coupon per 6 months, a redemption frequency of above 45%, and a user average purchase price of at least $10 (using the savings calculation).

It is within the scope of the invention to use a variety of combination of calculations to determine the savings percent.

Hardware Components

Figure 6:
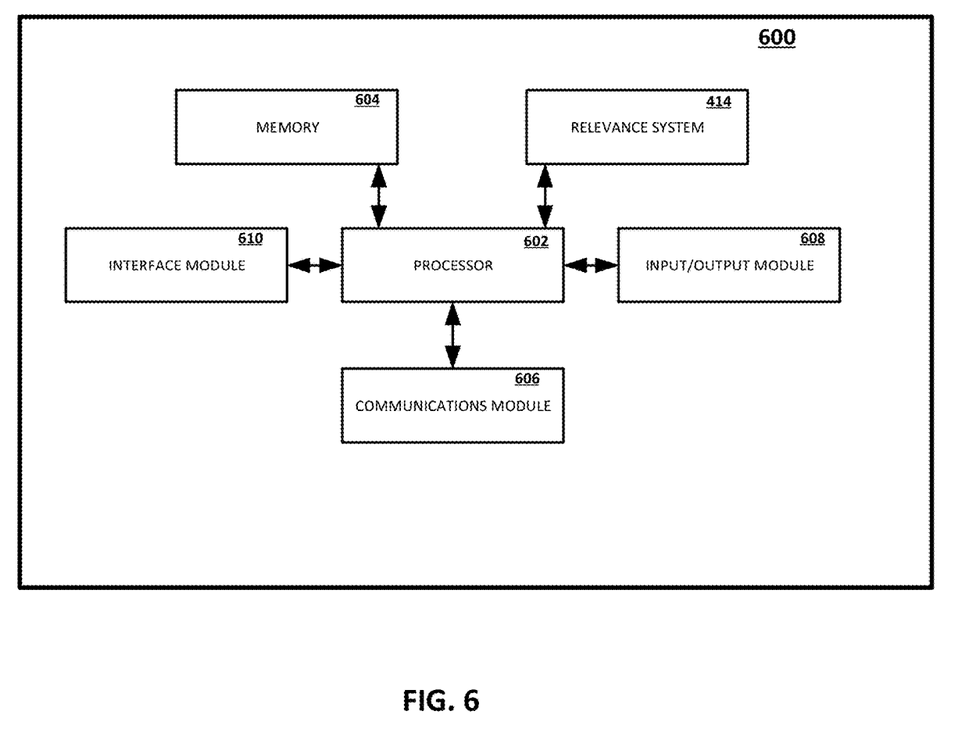
FIG. 6 illustrates a schematic block diagram of circuitry that can be included in a mobile device, promotion and marketing service system, and/or financial service system in accordance with some embodiments discussed herein.

FIG. 6 shows a schematic block diagram of circuitry 600, some of or all of which may be included in, for example, promotion and marketing system 107, mobile device 103, and financial service system. Any of the aforementioned systems or devices may include circuitry 600 and may be configured to, either independently or jointly with other devices in system 100 perform the functions of the circuitry 600 described herein. As illustrated in FIG. 6, in accordance with some example embodiments, circuitry 600 can include various means such as processor 602, memory 604, communications module 606, and/or input/out module 408. In some embodiments, interface module 610. As referred to herein, "module" includes hardware, software, and/or firmware configured to perform one or more particular functions. In this regard, the means of circuitry 600 may be embodied as hardware elements (e.g., a suitable programmed processor, combinational logic circuit, and/or the like), a computer program product comprising computer-readable program instructions stored on a non-transitory computer readable medium (e.g., memory 604) that is executable by a suitably configured processing device (e.g. processor 602), or some combination thereof.

Processor 602 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 6 as a single processor, in some embodiments processor 602 comprises a plurality of processors. The plurality of processors may be embodied on a single computing device or may be distributed across a plurality of computing devices collectively configured to function as circuitry 600. The plurality of processors may be in operative communication with each other and may be collectively configured to perform one or more functionalities of circuitry 600 as described herein. In an example embodiment, processor 602 is configured to execute instructions stored in memory 604 or otherwise accessible to processor 602. These instructions, when executed by processor 602, may cause circuitry 600 to perform one or more of the functionalities of circuitry 600 as described herein.

Whether configured by hardware, firmware/software methods, or by a combination thereof, processor 602 may comprise an entity capable of performing operations according to embodiments of the present invention while configured accordingly. Thus, for example, when processor 602 is embodied as an ASIC, FPGA or the like, processor 602 may comprise specifically configured hardware for conducting one or more operations described herein. Alternatively, as another example, when processor 602 is embodied as an executor of instructions, such as may be stored in memory 604, the instructions may specifically configure processor 602 to perform one or more algorithms and operations described herein, such as those discussed in connection with FIGS. 1-7.

Memory 604 may comprise, for example, volatile memory, non-volatile memory, or some combination thereof. Although illustrated in FIG. 6 as a single memory, memory 604 may comprise a plurality of memory components. The plurality of memory components may be embodied on a single computing device or distributed across a plurality of computing devices. In various embodiments, memory 604 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 604 may be configured to store information, data (including item data and/or profile data), applications, instructions, or the like for enabling circuitry 600 to carry out various functions in accordance with example embodiments of the present invention. For example, in at least some embodiments, memory 604 is configured to buffer input data for processing by processor 602. Additionally or alternatively, in at least some embodiments, memory 604 is configured to store program instructions for execution by processor 602. Memory 604 may store information in the form of static and/or dynamic information. This stored information may be stored and/or used by circuitry 600 during the course of performing its functionalities.

Communications module 606 may be embodied as any device or means embodied in circuitry, hardware, a computer program product comprising computer readable program instructions stored on a computer readable medium (e.g., memory 604) and executed by a processing device (e.g., processor 602), or a combination thereof that is configured to receive and/or transmit data from/to another device and/or network, such as, for example, a second circuitry 600 and/or the like. In some embodiments, communications module 606 (like other components discussed herein) can be at least partially embodied as or otherwise controlled by processor 602. In this regard, communications module 606 may be in communication with processor 602, such as via a bus. Communications module 606 may include, for example, an antenna, a transmitter, a receiver, a transceiver, network interface card and/or supporting hardware and/or firmware/software for enabling communications with another computing device. Communications module 606 may be configured to receive and/or transmit any data that may be stored by memory 604 using any protocol that may be used for communications between computing devices. Communications module 606 may additionally or alternatively be in communication with the memory 604, input/output module 608 and/or any other component of circuitry 600, such as via a bus.

Input/output module 608 may be in communication with processor 602 to receive an indication of a user input and/or to provide an audible, visual, mechanical, or other output to a user (e.g., provider and/or consumer). Some example visual outputs that may be provided to a user by circuitry 600 are discussed in connection with FIGS. 1-7. As such, input/output module 608 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 600 is embodied as a server or database, aspects of input/output module 608 may be reduced as compared to embodiments where circuitry 600 is implemented as an end-user machine (e.g., consumer device and/or wearable device) or other type of device designed for complex user interactions. In some embodiments (like other components discussed herein), input/output module 608 may even be eliminated from circuitry 600. Alternatively, such as in embodiments wherein circuitry 600 is embodied as a server or database, at least some aspects of input/output module 608 may be embodied on an apparatus used by a user that is in communication with circuitry 600. Input/output module 608 may be in communication with memory 604, communications module 606, and/or any other component(s), such as via a bus. One or more than one input/output module and/or other component can be included in circuitry 600.

Interface module 610 may also or instead be included and configured to perform the functionality discussed herein related to generating, arranging, presenting and/or editing wearer components, redemption components, wearer interfaces, redemption interfaces, item data, and/or profile data. In some embodiments, some or all of the functionality of generating, arranging, presenting and/or editing wearer components, redemption components, wearer interfaces, redemption interfaces, item data and/or profile data may be performed by processor 602 or interface module 610. For example, non-transitory computer readable media can be configured to store firmware, one or more application programs, and/or other software, which include instructions and other computer-readable program code portions that can be executed to control each processor (e.g., processor 602, and/or interface module) of the components of system 600 to implement various operations, including the examples shown above. As such, a series of computer-readable program code portions are embodied in one or more computer program goods and can be used, with a computing device, server, and/or other programmable apparatus, to produce machine-implemented processes.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A system for providing a discount comprising:
 a remote system comprising communication circuitry and processing circuitry, the remote system in communication with a mobile application running on a mobile device, the mobile device comprising:
  communication circuitry, processing circuitry, a memory storing the mobile application and computer-readable program instructions configured to, upon execution by the processing circuitry, cause the mobile application to:
   access a global positioning system of the mobile device to determine location data of the mobile device, wherein the location data comprises at least a latitude and a longitude;
   determine user account data associated with a user of the mobile device; transmit the location data and the user account data to the remote system, wherein the remote system determines a data object indicative of a promotion value by:
    determining one or more establishments based at least in part on the location data;

determining a consumer value based at least in part on the user account data; and determining a promotion value associated with at least one of the establishments;

receive, from the remote system, the data object indicative of the promotion value and the corresponding establishment on the mobile device;

render the data object on the mobile device in order to display an indication of the establishment and the corresponding promotion value;

transmit, to the remote system, a selection data object indicative the user's interaction with the displayed establishment and the promotion value; and if the selection data indicates the user's acceptance of the displayed establishment and promotion value:

associate, the promotion value that corresponds to the establishment with the user account data, and associate a merchant identifier corresponding to the establishment with the user account data;

provide a discount; and provide indication on the mobile device that the discount has been applied.

2. The system of claim 1, wherein the remote system further:

receives a payment object indicating a completion of a transaction with the establishment; and determines if the received user payment data corresponds to payment data previously associated with the user account data.

3. The system of claim 2, wherein the payment object comprises a merchant identifier corresponding to the establishment and wherein the remote system further:

determines if the received merchant identifier corresponds to the merchant identifier previously associated with the user account.

4. The system of claim 3, wherein the remote system further:

transmits to a financial institution a payment credit for a dollar amount equal to the promotion value if the received user payment data positively corresponds to the payment information and the received merchant identifier positively corresponds to the stored merchant identifier.

5. The system of claim 2, wherein the user payment data indicates that the promotion value has not been applied.

6. The system of claim 1, wherein the remote system determines the promotion value by:

accessing a menu corresponding to the establishment;

identifying a first average price of a first portion of the menu;

identifying a second average price of a second portion of the menu;

identifying a third average price of a third portion of the menu, wherein each first, second, and third portions are different;

determining a total meal cost by adding the first, second, and third average prices together;

determining a saving percentage based on the user's account data; and calculating, the promotion value as a function of the total meal cost and the savings percentage.

7. The system of claim 6, wherein the first portion of the menu corresponds to appetizers, the second portion of the menu corresponds to entrees and the third portion of the menu corresponds to beverages.

8. A method for providing a discount on a mobile device, the method comprising:

accessing, by processing circuitry of the mobile device, a global positioning system of the mobile device to determine location data of the mobile device, wherein the location data comprises at least a latitude and a longitude;

determining, by the processing circuitry of the mobile device, user account data associated with a user of the mobile device;

transmitting, by the processing circuitry of the mobile device, the location data and the user account data to a remote system, wherein the remote system determines a data object indicative of a promotion value by:

determining one or more establishments based at least in part on the location data;

determining a consumer value based at least in part on the user account data; and determining the promotion value associated with at least one of the establishments;

receiving, by the processing circuitry of the mobile device, the data object indicative of the promotion value and the corresponding establishment from the remote system;

rendering, by the processing circuitry of the mobile device, the data object on the mobile device in order to display an indication of the establishment and the corresponding promotion value; and transmitting, by the processing circuitry of the mobile device, a selection data object indicative of the user's interaction with the displayed establishment and the promotion value to the remote system; and if the selection data indicates the user's acceptance of the displayed establishment and promotion value, the remote server further:

associates, the promotion value that corresponds to the establishment with the user account data, and associates a merchant identifier corresponding to the establishment with the user account data;

provides a discount; and provides indication, to the processing circuitry of the mobile device, the discount has been applied.

9. The method of claim 8, wherein the remote system further:

receives a payment object indicating a completion of a transaction with the establishment; and determines if the received payment object corresponds to payment data previously associated with the user account data.

10. The method of claim 9, wherein the payment object comprises a merchant identifier corresponding to the establishment and the remote system further:

determines if the received merchant identifier corresponds to the merchant identifier previously associated with the user account data.

11. The method of claim 10, wherein if the received user payment data positively corresponds to the payment information and the received merchant identifier positively corresponds to the stored merchant identifier, the remote system further:

transmits to a financial institution a payment credit for a dollar amount equal to the promotion value.

12. The method of claim 11, wherein the user payment data indicates that the promotion value has not been applied.

13. The method of claim 8, wherein the remote system determines the promotion value by:
- accessing a menu corresponding to the establishment;
- identifying a first average price of a first portion of the menu;
- identifying a second average price of a second portion of the menu;
- identifying a third average price of a third portion of the menu, wherein each first, second, and third portions are different;
- determining a total meal cost by adding the first, second, and third average prices together;
- determining a savings percentage based on the user's account data; and
- calculating the promotion value as a function of the total meal cost and the savings percentage.

14. The method of claim 13, wherein the first portion of the menu corresponds to appetizers, the second portion of the menu corresponds to entrees and the third portion of the menu corresponds to beverages.

15. A computer program product for providing a discount, the computer program product comprising computer-readable program instructions stored on a non-transitory computer readable medium, the computer-readable program instructions configured, upon execution by a processor, to:
- access a global positioning system of a mobile device to determine location data of the mobile device, wherein the location data comprises at least a latitude and a longitude;
- determine user account data associated with a user of the mobile device;
- transmit the location data and the user account data to a remote system, wherein the remote system determines a data object indicative of a promotion value by:
  - determining one or more establishments based at least in part on the location data;
  - determining a consumer value based at least in part on the user account data; and
  - determining the promotion value associated with at least one of the establishments;
- receive, from the remote system, the data object indicative of the promotion value and the corresponding establishment;
- render the data object on the mobile device in order to display an indication of the establishment and the corresponding promotion value;
- transmit, to the remote system, a selection data object indicative of the user's interaction with the displayed establishment and the promotion value; and if the selection data indicates the user's acceptance of the displayed establishment and the promotion value, the remote system further:
- associates the promotion value that corresponds to the establishment with the user account data;
- associates a merchant identifier corresponding to the establishment with the user account data;
- provides a discount; and
- provides an indication on the mobile device that the discount has been applied.

16. The computer program product of claim 15, wherein the remote system further:
- receives a payment object indicating a completion of a transaction with the establishment; and
- determines if the received payment object corresponds to payment data previously associated with the user account data.

17. The computer program product of claim 16, wherein the payment object comprises a merchant identifier corresponding to the establishment and the remote system further:
- determines if the received merchant identifier corresponds to the merchant identifier previously associated with the user account data.

18. The computer program product of claim 17, wherein if the received user payment data positively corresponds to the payment information and the received merchant identifier positively corresponds to the stored merchant identifier, the remote system that provides the discount further:
- transmits to a financial institution a payment credit for a dollar amount equal to the promotion value.

19. The computer program product of claim 18, wherein the user payment data indicates that the promotion value has not been applied.

20. The computer program product of claim 15, wherein the remote system determines the promotion value by:
- accessing a menu corresponding to the establishment;
- identifying a first average price of a first portion of the menu;
- identifying a second average price of a second portion of the menu;
- identifying a third average price of a third portion of the menu, wherein each first, second, and third portions are different;
- determining a total meal cost by adding the first, second, and third average prices together;
- determining a savings percentage based on the user's account data; and
- calculating the promotion value as a function of the total meal cost and the savings percentage.

* * * * *